United States Patent
Grill

[15] 3,664,509
[45] May 23, 1972

[54] FLUIDS FLOW SYSTEM WITH SELF-FLUSHING REVOLVING FILTER

[72] Inventor: Raymond J. Grill, Richmond Heights, Ohio

[73] Assignee: TRW Inc., Cleveland, Ohio

[22] Filed: Nov. 4, 1969

[21] Appl. No.: 873,970

[52] U.S. Cl..............................................210/391, 210/416
[51] Int. Cl.......................................................B01d 33/22
[58] Field of Search..................................210/391, 393, 416

[56] References Cited

UNITED STATES PATENTS 2,266,980   12/1941   McNeal.................................210/393

Primary Examiner—J. L. De Cesare
Attorney—Hill, Sherman, Meroni, Gross & Simpson

[57] ABSTRACT

Pumps or other fluids handling devices are protected from contaminants in the fluids by alternately presenting localized portions of a filter media to the flow paths of fluids entering and leaving the device to filter out the contaminants from the fluids entering the device and to flush out the filter media with the fluids leaving the device. In a preferred embodiment, a continuous revolving filter intersects the inlet and discharge passages of a pump to divert contaminant particles in the fluid from the pump inlet to the pump outlet without allowing the particles to pass through the pump, and concurrently backwashing the filter element by pressurized fluid from the pump.

8 Claims, 4 Drawing Figures

INVENTOR.
RAYMOND J. GRILL

3,664,509

FLUIDS FLOW SYSTEM WITH SELF-FLUSHING REVOLVING FILTER

BACKGROUND OF THE INVENTION

1. Field of the Invention

This invention relates to the art of protecting fluids handling devices, such as pumps, from contaminants in the fluids handled by the devices, and specifically relates to the filtering art. The invention is particularly useful in aircraft fuel systems to protect the main engine fuel pump without requiring a reservoir to store trapped fuel contaminants.

2. Description of the Prior Art

Filters for engine fuel systems are usually of the contaminant trapping or retention type. These filters are either incorporated in the fuel system between the booster pump and the main fuel pump or between the main fuel pump and the control device for the fluid feed to the engine. In high altitude flying jet craft, such filters not only become clogged with fuel contaminants, but also with ice particles, thereby requiring by-passing of the filter when the pressure differential across the filter media becomes excessive due to clogging. Of course, by-passing of the filter exposes the downstream components to the contaminants in the fuel.

Backwashing of filters is also known in the prior art as, for example, in the Karl B. Britton U.S. Pat. No. 2,101,211, but only a small portion of the filtered fluid is used for the backwashing operation, and the washed-out contaminants are either trapped and separated from the counter-stream or returned to the pump, thus failing to protect the pump and requiring piping, reservoirs and the like not desirable in aircraft.

SUMMARY OF THE INVENTION

The present invention now provides a system, such as an aircraft fuel system, which will afford continuous protection of equipment, such as aircraft fuel pumps, against detrimental contaminant particles, does not require reservoir space to store trapped contaminants, does not require filter element replacements, and maintains a constant pressure drop.

According to this invention a continuously revolving filter element intersects the inlet and discharge passages of the fluids handling equipment, such as a pump, to be protected. Contaminant particles in the fluid are diverted from the inlet to the outlet of the equipment being protected without allowing the particles to pass through the equipment. Because of the continuous rotation of the filter media, contaminant particles are removed from the fluid entering the equipment, while concurrently these contaminant particles are reverse flow flushed from the filter media by fluid leaving the equipment.

The continuous revolving filter is preferably positioned between the boost stage and the high pressure gear pump stage of a jet engine aircraft fuel system. The filter unit is preferably driven by a mechanical power take-off from the engine driven fuel pump. While one localized portion of the filter media is filtering out contaminants from fluid flowing therethrough in one direction, another localized portion of the filter media is being backwashed by fluid flowing through the media in the opposite direction, and at the same time the filter media is being rotated so as to progressively advance contaminated containing portions to the backwashing area while feeding clean portions to the filtering area.

It is then an object of this invention to provide a fluids handling system which will protect apparatus in the system from contaminants in the fluids without requiring storage areas for the contaminants or replacement of filtering elements.

Another object of this invention is to provide a continuous revolving filter between the boost and high-pressure stage of an aircraft engine fuel system which will remove contaminants from fluid entering the high-pressure stage and then be freed of said contaminants by fluid leaving this high-pressure stage.

A specific object of this invention is to provide a continuous revolving filter in the inlet and discharge passages of a pump to divert contaminant particles in fluid being fed to the pump to the fluid discharged from the pump without allowing the particles to pass through the pump.

Another object of this invention is to provide a jet engine aircraft fuel system which temporarily removes contaminants from fuel to protect the main fuel pump of the system, and then reintroduces the contaminants back into the fuel downstream from the pump.

Other objects, features and advantages of this invention will be apparent from the following description of a certain preferred embodiment of the invention, taken in conjunction with the accompanying drawings, although variations and modifications may be effected without departing from the spirit and scope of the novel concepts of the disclosure.

DESCRIPTION OF THE PREFERRED EMBODIMENT

Figure 1:
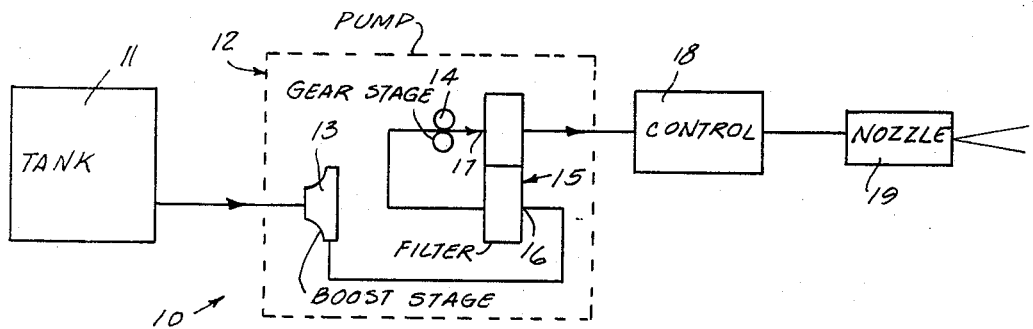
FIG. 1 is a schematic view of one fluid flow system of this invention showing the revolving filter of the invention incorporated between the boost stage and high pressure gear stage of a jet engine fuel system.

In FIG. 1 the reference numeral 10 indicates generally one possible arrangement of a fluids handling system according to this invention. In the system 10 jet engine fuel from a tank 11 is fed to a pump indicated generally at 12 and having a boost stage 13 and a gear stage or high-pressure stage 14. The continuous revolving filter 15 of this invention is interposed between the boost stage 13 and the gear stage 14 of the pump 12, with the fuel flowing from the boost stage 13 entering an inlet 16 on one side of the filter device 15, flowing through the filter, and then to the gear stage 14, from which it enters the outlet side 17 of the unit 15, which is on the opposite side from the inlet 16. The fluid again flows through the filter 15 in the opposite direction from its first pass, and then flows to fuel flow control equipment 18, and from this to the jet engine burner nozzle, such as 19.

It will be clear from FIG. 1 that the revolving filter 15 separates contaminants from fuel about to enter the gear stage 14 of the pump and then reintroduces the filtered-out contaminants to the fuel leaving this gear stage.

Figure 2:
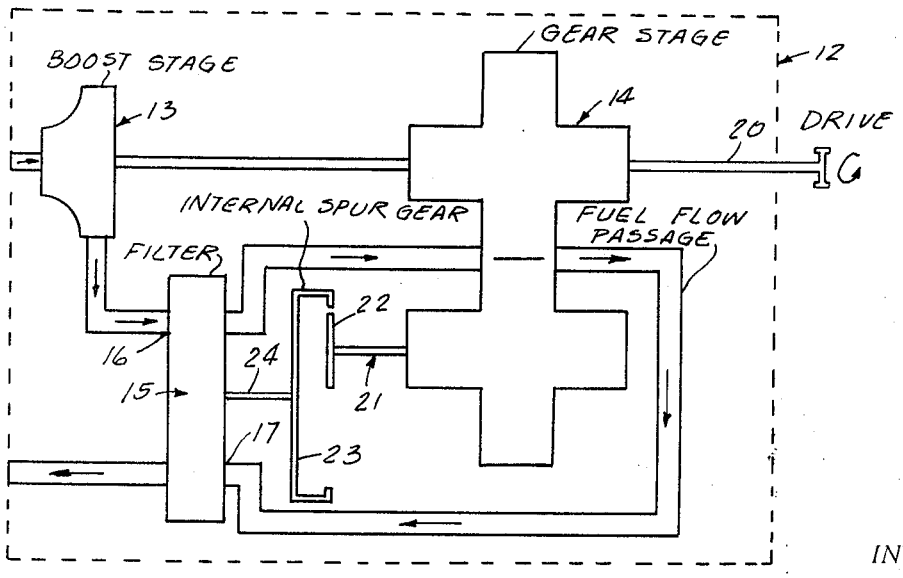
FIG. 2 is a schematic view of one arrangement for driving the revolving filter of this invention in a fuel system such as is shown in FIG. 1.

As shown in FIG. 2, the pump 12, including both the boost and gear stages thereof, is driven through a power take-off 20 from the jet engine (not shown), and the revolving filter 15, in turn, is driven through a power take-off 21 from the gear stage 14. The power take-off 21 includes an external pinion gear 22 directly coupled to a driven gear of the gear pump stage 14 which, in turn, drives an internal spur gear 23 coupled to a drive shaft 24 for the filter unit 15.

Figure 3:
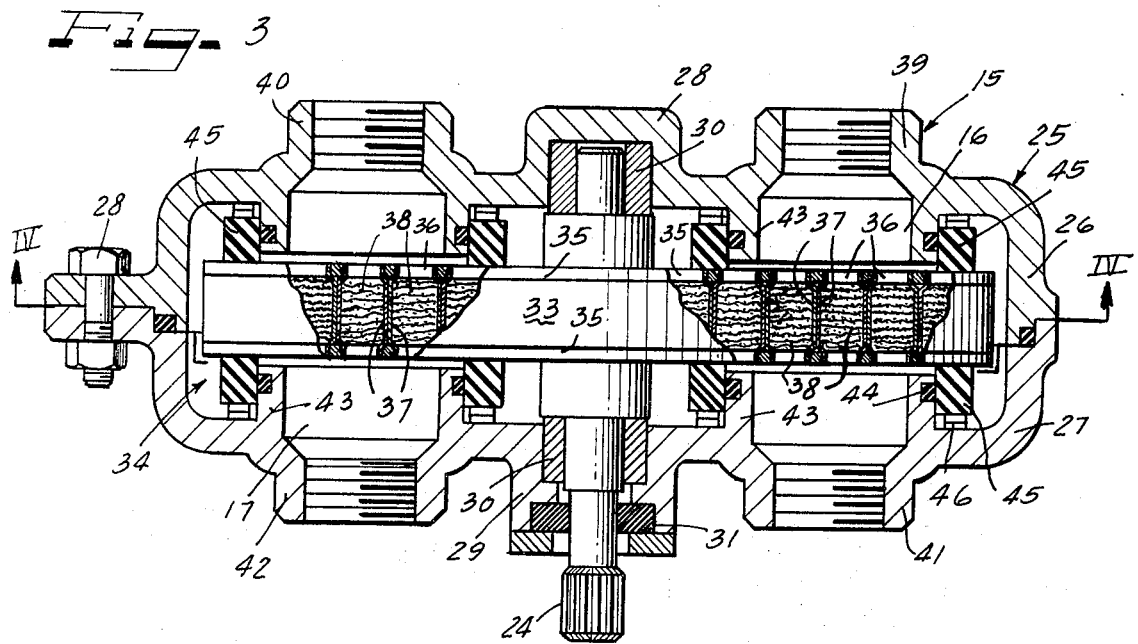
FIG. 3 is a vertical cross-sectional view, with parts in elevation, of a revolving filter according to this invention.
Figure 4:
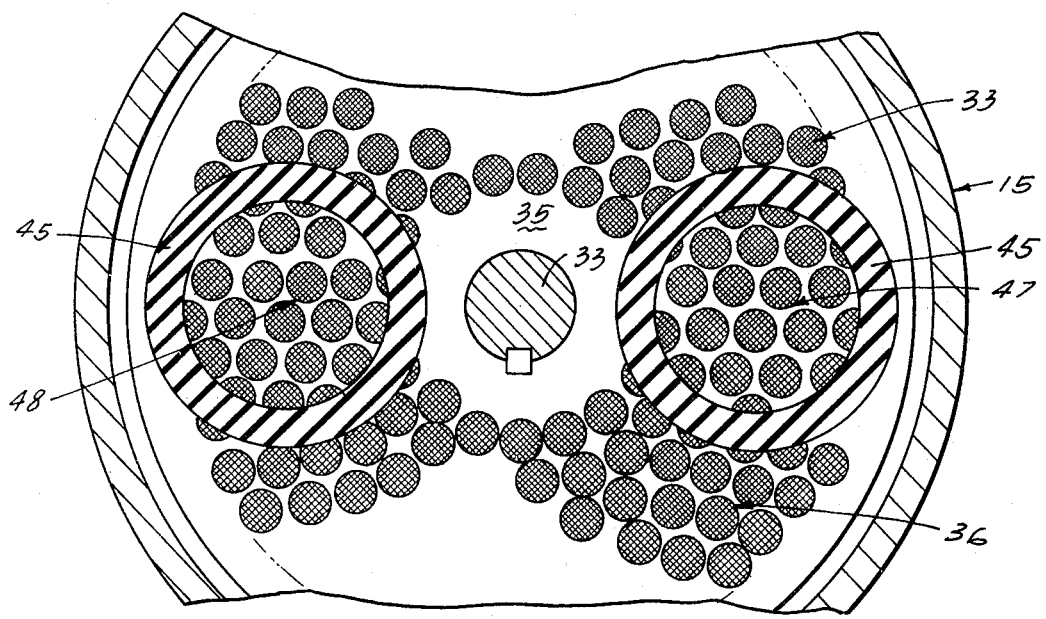
FIG. 4 is a transverse cross-sectional view of the filter taken along the line IV—IV of FIG. 3.

As best shown in FIGS. 3 and 4, the revolving filter unit 15 has a generally circular housing 25 composed of mating cup-shaped halves 26 and 27 secured together by bolts such as 28. The housing part 26 has a central boss 28 with a closed end aligned with a central boss 29 in the housing part 27 having an open end. The bosses 28 and 29 carry bearings 30 which rotatably mount the drive shaft 24. The shaft is sealed by a seal 31 in the open end of the boss 29.

The shaft 24 has an enlarged central hub portion 32 on which is secured a rotating filter disk unit 33 which radiates from the shaft across the central portion of a circular chamber 34 provided by the housing 25. The filter disk unit 33, as shown, is built up from end plates 35, each with a circular band 36 of holes. Connecting these holes and serving to hold the assembly together are upright tubular elements 38. These tubular elements contain filter media such as stacked wafers of screen. The screen wafers may be of progressively finer mesh from the inlet to the outlet ends of the tubes 38 (top to bottom as viewed in FIG. 3). The unit 33 is a cylindrical plate or drum with flat end faces and a circular periphery of less diameter than the housing 25 so as to fit freely in the chamber 34. The end plates 35 of the unit 33 may be composed of metal, rigid plastic, or the like, with the holes arranged in a circular band 36 surrounding the central hub portion 33 and within extends to a solid peripheral portion. The band of holes 36 is composed of successive circular rows of holes registering with the filter media 37.

The housing half 26 has internally threaded out-turned bosses 39 and 40 on opposite sides of the central boss 28. The housing half 27 has similar out-turned internally threaded bosses 41 and 42, with the boss 41 being aligned with the boss 39, and the boss 42 being aligned with the boss 40.

Each housing half 26 and 27 has an inwardly-projecting cylindrical flange 43 aligned with each boss 39-40 and projecting inwardly into closely spaced relation with the faces of the filter disk 33. These flanges 43 are externally grooved and carry in the grooves thereof an O-ring seal 44. Cylindrical rigid seal rings 45 surround the flanges 43 and seal against the O-rings 44. Springs 46 between the housing halves and these circular seals 45, such as wave-washer springs, urge the seals 45 against the faces or sides of the filter disk 33.

The band of holes 36 through the filter disk 33 has a radial width equal to or less than the internal diameter of the seals 45 so that the seals will extend beyond the rows of holes, as illustrated in FIG. 5.

The flanges 43 and the seals 45 cooperate to confine localized areas of the band of holes 36 with the inlet passage 16 and the outlet passage 17, identified in FIG. 1. Thus, as shown in FIG. 3, the boss or nipple 39 communicates with a circular zone inside of the flange 43, and fluid from this boss flows through this localized zone, through the holes 36 registering with this zone, and then into a similar zone on the opposite side of the filter disk which communicates with the boss or nipple 41. In a similar manner the boss or nipple 42 discharges into a localized zone on the opposite side of the housing, which, in turn, communicates with a localized ring of holes diametrically opposite the holes registering with the inlet, and these holes, in turn, discharge through the nipple or boss 40.

In FIG. 4 the localized zone of holes 36 registering with the inlet 16, as identified at 47, while the localized zone of holes registering with the outlet 17 is identified at 48.

It will, of course, be understood that as the filter disk 33 is driven by the drive shaft 24, the filter holes 36 will successively register with the zones 47 and 48, and fluid flowing through the inlet 16 will be filtered, with the contaminants being retained by the filter material 38 in the holes. Only clear, filtered fuel can then enter the gear stage 14 of the pump.

The fuel exiting from the gear stage 17 of the pump then enters the outlet passage 17 and flows back through the filter disk 33 in a direction opposite to the direction of the first pass through the filter. This, of course, backwashes the filter material 38 and removes the contaminants from the filter. The cleaned filter portions are then returned to the inlet 16.

From the above descriptions it should, therefore, be understood that the filter disk 33 is continuously rotated to advance cleaned portions to the inlet, and the contaminated portions are simultaneously backwashed or cleaned. All of the contaminants are reintroduced into the previously filtered fluid, and the filter element will not become clogged and does not build up a back pressure through the filter. Since the filter disk 33 rotates continuously, any slush or ice particles tending to form in the system will be worked and broken up to prevent a clogging of the inlet. This working of the ice particles tends to melt them, and if any particles do reach the outlet of the filter, they are flushed from the filter by the highly pressurized fuel from the gear stage of the pump.

I claim as my invention:

1. A fluid flow system having a single fluid flow path in which contaminants in the fluid are bypassed around a device in the system without leaving the system comprising a fluid conduit having an inlet and an outlet end, a device having an inlet communicating with the inlet end of the conduit and an outlet communicating with the outlet end of the conduit, a filter unit having a housing with a first flow passage in the conduit ahead of the inlet of said device and a second flow passage in the conduit beyond the outlet of said device, a rotating filter element in said housing receiving therethrough in one direction fluids flowing through said first passage of the housing to remove contaminants from the fluids, and receiving in the opposite direction fluids flowing through said second passage of said housing to backwash the contaminants therefrom, and means for rotating said rotatable filter unit in said housing to simultaneously expose clean filter areas to said first flow passage and contaminated filter areas to said second flow passage.

2. A fuel system for engines which comprises an engine-driven pump having a boost stage and a high-pressure gear pump stage, a single conduit means having an inlet end feeding fuel to said boost stage and an outlet end receiving fuel from said gear pump stage, a filter unit having a housing with a first flow path between the boost stage and gear pump stage receiving fuel from the boost stage in one direction and discharging fuel to the gear pump stage and a second through flow path receiving fuel in the opposite direction from the gear pump stage to the outlet of the conduit a revolving filter element in said housing driven by said gear pump stage, and said revolving filter element presenting clean filter areas to the fuel entering the gear pump stage and simultaneously presenting contaminated areas to the discharge from said gear pump stage for backwashing the filter element.

3. An engine fuel system having a single fuel flow path in which contaminants in the fuel are bypassed around a high-pressure pump without leaving the flow path which comprises a booster pump having an inlet receiving fuel from a source and an outlet discharging the fuel at low pressure, a gear pump having an inlet receiving low pressure fuel from the outlet of the booster pump and an outlet discharging high pressure fuel to the engine, a filter having a housing with a first through path between the outlet of the booster pump and the inlet of the gear pump and a second through path between the outlet of the gear pump and the engine, a filter disk rotatably mounted in said filter housing coupled to said gear pump for corotation to successively exposed localized areas thereof to the first flow path and then to the second flow path whereby contaminants in the low pressure fuel from the booster pump are removed from the fuel entering the gear pump while the contaminants are simultaneously backwashed from the filter disk by the high-pressure fuel from the gear pump to be reintroduced into the fuel to the engine whereby the gear pump is protected from contaminants and no build-up of contaminants will occur.

4. The filter unit of claim 3 including a housing with inturned cylindrical flanges on opposite sides of the filter unit and circular seals surrounding said flanges engaging the filter unit to confine the inlet and outlet areas.

5. A fluid flow system having a flow path in which contaminants in the fluid are bypassed around a pump in the system without leaving the system which comprises conduit means having an inlet end and an outlet end, a first pump in said conduit means receiving fluid from said inlet end, a second pump in said conduit means receiving fluid from said first pump and discharging fluid to said outlet end, a revolving filter in said conduit means having a first passage receiving fluid from said first pump en route to said second pump and a second flow path receiving fluid from said second pump en route to said outlet, a rotating filter disk in said filter means movable through said first and second flow paths to filter out contaminants en route to the second pump and to transfer said contaminants to said second flow path for backwashing the contaminants into the outlet with fluid from the second pump, and seal means in each of said flow paths acting on the filter disk to confine the flow through the disk to the localized successive areas of the disk exposed to the flow paths.

6. The filter of claim 5 wherein the seals are rings urged against opposite faces of the filter disk.

7. The filter of claim 5 wherein the filter disk is a composite assembly of upright tubular elements containing filter media.

8. The filter disk of claim 7 wherein the filter media are stacked screen wafers having successively finer mesh from the inlet to the outlet ends thereof.

* * * * *